(12) United States Patent
Lu et al.

(10) Patent No.: US 10,023,289 B2
(45) Date of Patent: Jul. 17, 2018

(54) VARIABLE-THICKNESS WINDSHIELD

(71) Applicant: Bell Helicopter Textron Inc., Fort Worth, TX (US)

(72) Inventors: Zi Lu, Coppell, TX (US); Michael Seifert, Southlake, TX (US); Marc-Andre Rossini, Piedmont (CA)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 133 days.

(21) Appl. No.: 15/044,974

(22) Filed: Feb. 16, 2016

(65) Prior Publication Data
US 2016/0264230 A1 Sep. 15, 2016

Related U.S. Application Data

(60) Provisional application No. 62/131,011, filed on Mar. 10, 2015.

(51) Int. Cl.
*B64C 1/14* (2006.01)
(52) U.S. Cl.
CPC ................. *B64C 1/1484* (2013.01)
(58) Field of Classification Search
CPC ... B64C 1/1476; B64C 1/1484; B64C 1/1492; B64C 27/04; B64D 45/00; B32B 17/10018; B32B 17/10293; B32B 17/10302; E06B 3/00; B60J 1/20; B60J 1/008; B60J 10/18; B60J 10/20
See application file for complete search history.

(56) References Cited

U.S. PATENT DOCUMENTS

| | | | |
|---|---|---|---|
| 2,511,168 A * | 6/1950 | Martin | B29C 70/08 156/293 |
| 4,081,581 A | 3/1978 | Littell, Jr. | |
| 4,933,227 A | 6/1990 | Stewart | |
| 5,289,996 A | 3/1994 | Speelman, III | |
| 5,506,057 A * | 4/1996 | Olson | B32B 17/10 156/102 |
| 6,461,704 B1 | 10/2002 | Matsco et al. | |
| 6,636,370 B2 * | 10/2003 | Freeman | B32B 3/02 156/100 |
| 6,689,240 B2 * | 2/2004 | Jesse | B64C 1/1492 156/108 |
| 6,796,528 B2 * | 9/2004 | Wood | B64C 1/1476 244/121 |
| 2008/0271857 A1 * | 11/2008 | Swadling | B64C 1/1476 160/179 |
| 2010/0163676 A1 * | 7/2010 | Burgunder | B64C 1/1492 244/129.3 |
| 2013/0026296 A1 * | 1/2013 | Yokoi | B32B 17/10045 244/129.3 |
| 2013/0033894 A1 * | 2/2013 | Kleo | B32B 17/10036 362/602 |

FOREIGN PATENT DOCUMENTS

EP 1481892 B1 3/2011

* cited by examiner

*Primary Examiner* — Medhat Badawi
*Assistant Examiner* — Vicente Rodriguez
(74) *Attorney, Agent, or Firm* — Patent Capital Group

(57) ABSTRACT

According to one embodiment, a rotorcraft front windshield comprises an optically-transparent material having a non-uniform thickness profile such that the front windshield is a first thickness at a first position and a second thickness at a second position, the first thickness being different from the second thickness.

20 Claims, 2 Drawing Sheets

VARIABLE-THICKNESS WINDSHIELD

RELATED APPLICATIONS

Pursuant to 35 U.S.C. § 119 (e), this application claims priority to U.S. Provisional Patent Application Ser. No. 62/131,011, entitled VARIABLE-THICKNESS WINDSHIELD, filed Mar. 10, 2015. U.S. Provisional Patent Application Ser. No. 62/131,011 is hereby incorporated by reference.

TECHNICAL FIELD

This invention relates generally to aircraft windshields, and more particularly, to a variable-thickness windshield.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

A rotorcraft may include a variety of windows. Some of these windows may allow the pilot to see outside the rotorcraft. Two examples of a rotorcraft window may include one or more front windshields.

SUMMARY

Particular embodiments of the present disclosure may provide one or more technical advantages. A technical advantage of one embodiment may include the capability to improve pilot visibility and optics. A technical advantage of one embodiment may include the capability to reduce the weight and thickness of a front windshield. A technical advantage of one embodiment may include the capability to protect against birdstrikes.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
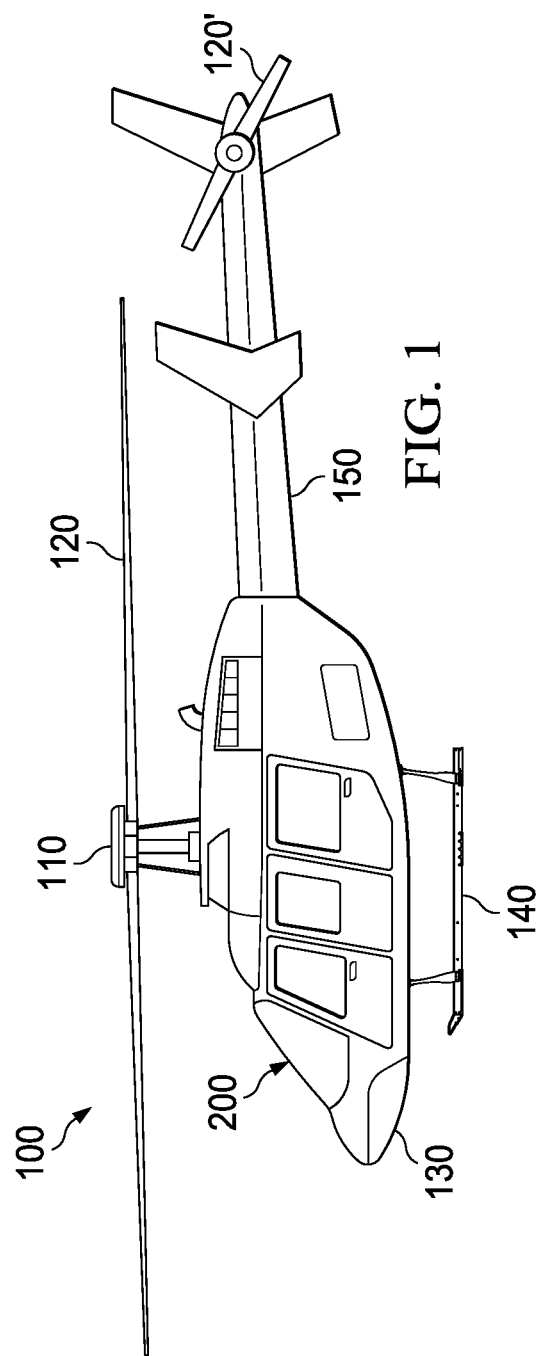
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

In the example of FIG. 1, rotorcraft 100 includes a number of different windows, including a front windshield 200. In the specific example of FIG. 1, rotorcraft 100 features two front windshields 200, but only one front windshield 200 is shown in the side view.

In this example, each windshield 200 is made from a single, continuous, uninterrupted material. Teachings of certain embodiments recognize that front windshield 200 may be made of a variety of materials. In some embodiments, front windshield 200 may be made of a polycarbonate material. Polycarbonate is an engineering polymer and may be known for its low density, optical transparency, high toughness and high-temperature stability. Polycarbonate may exhibit high toughness and may be used in applications that require high impact strength and optical clarity, such as safety glass, face shields, helmets, and bulletproof glass.

Under some loading conditions, a polycarbonate sheet exhibits ductile behavior characterized by initial elastic deformation followed by yielding and then extensive post-yielding plastic deformation to large strains. Teachings of certain embodiments recognize that the large plastic deformation of the polycarbonate may provide superior energy absorption capability when subjected to a high-energy impact.

The ability of polycarbonate to accommodate high-energy impacts may be particularly beneficial because, during operation, rotorcraft 100 may encounter a variety of potentially dangerous objects. One example of a potentially dangerous object may include a bird. Bird strikes are not uncommon, as it may not be possible for a pilot to maneuver around birds, and birds may fly across the aircraft's path.

If even just one bird hits rotorcraft 100 (or, alternatively, if rotorcraft 100 hits the bird), the impact could result in damage to rotorcraft 100. In some situations, the impact could be so significant that the bird ends up inside rotorcraft 100, potentially resulting in injury to the pilot, loss of aircraft control, and/or damage to flight critical systems. It is the preference of both pilot and poultry that birds remain outside the aircraft.

Although birds can cause damage at a number of different locations on rotorcraft 100, front windshields 200 are particularly vulnerable to acts of fowl play. A bird strike on a front windshield 200 could cause front windshield 200 to break, causing both the bird and broken windshield to enter the cockpit and disrupt the pilot's ability to fly the aircraft.

Although the large plastic deformation of the polycarbonate may provide superior energy absorption capability, polycarbonate can exhibit brittle failure with reduced impact resistance (i.e., less energy absorption) when exposed to loading conditions producing high triaxial stresses or high strain-rates. Brittle failure can occur in aircraft polycarbonate windshields even if the windshield does not have initial defects or cracks. For example, according to full-scale bird impact testing, windshields made of polycarbonate may exhibit brittle failure when the bird impacts the upper outboard corner location. The damage or crack initiated by the bird impact in a small region may propagate and cause catastrophic failure of a larger windshield area. The same tests have shown that the polycarbonate windshield does not exhibit similar brittle behavior when the bird impacts the center of the windshield or any of the other corners (upper inboard, lower inboard, and lower outboard). The energy absorption capacity, and thus impact resistance, of the polycarbonate over the vast majority of the windshield surface is substantially greater than the energy absorbed during brittle failure at the upper outboard corner.

Teachings of certain embodiments recognize that the avoidance of the brittle failure mode through targeted design provides an opportunity to provide equivalent or greater levels of impact protection using thinner and lighter polycarbonate windshields. Accordingly, teachings of certain embodiments recognize the capability to design front windshields 200 to mitigate the potential consequences of a bird strike using thinner and lighter polycarbonate windshields.

Figure 2A:
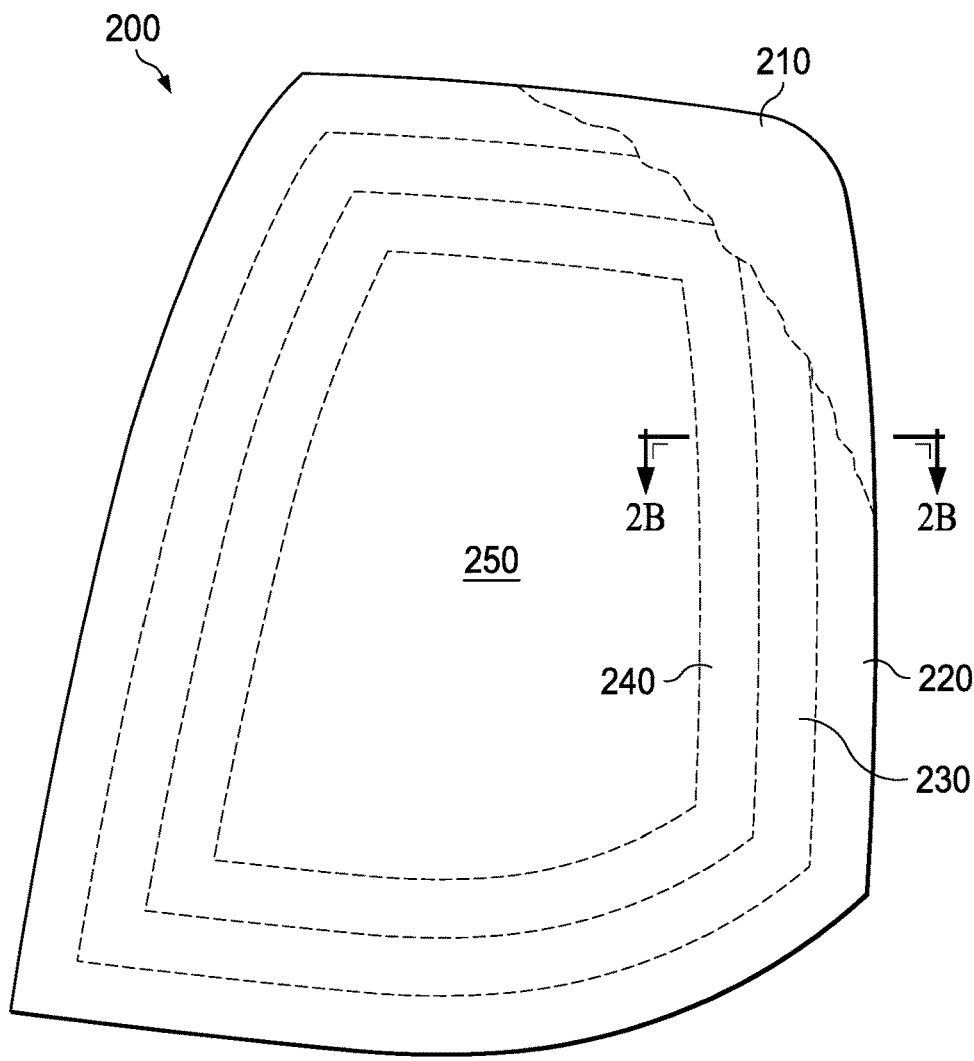
FIG. 2A shows the front windshield of the rotorcraft of FIG. 1 according to one example embodiment.

FIG. 2A shows front windshield 200 according to one example embodiment. For some aircraft, windshield thickness may be determined by the minimum thickness required to pass bird strike impact at a most critical location. In the example of FIG. 2A, this most critical location is the upper outboard corner. This area may be deemed most critical because this area may be more curved or bulged, increasing the tendency of brittle failure. Specifically, the local geometry and curvature at the windshield's upper outboard corner may induce complex loading when the bird directly hits at a nearby location. The combination of the loading and high strain-rate bird impact may make the upper outboard corner of windshield most vulnerable to bird strike.

In addition, front windshield 200 may also need to resist air load so the deformation or indentation of the windshield is limited. Although air pressure is usually uniformly applied over the whole windshield, the shell load and shell deformation may not be uniform due to the windshield geometry and windshield airframe boundary restriction. As another example, certain windshields may be designed to accommodate potential ballistic impacts or provide structural reinforcement.

Accordingly, teachings of certain embodiments recognize the capability to design front windshields 200 to mitigate the potential consequences of a bird strike and other potential failures. Accomplishing these goals, however, would typically require a thick, heavy windshield, especially if bird strike concerns at the upper outboard corner necessitate a thick windshield. As explained above, however, the energy absorption capacity of polycarbonate over the vast majority of the windshield surface may be substantially greater than the energy absorbed during brittle failure at the upper outboard corner. Accordingly, teachings of certain embodiments recognize the capability to provide a windshield with greater protection against brittle failure in the most critical portions of the windshield while providing less protection against brittle failure in other portions of the windshield.

In the example of FIG. 2A, windshield 200 is a variable-thickness windshield. Specifically, windshield 200 has a non-uniform thickness that varies as one moves across different paths along the windshield. In the example of FIG. 2A, windshield 200 is shown having five different thickness zones 210-250. Each zone has a different thickness of polycarbonate material. In this example, the zones correspond to where protection against brittle failure is needed. For example, zone 210 is in the upper outboard corner where bird strike protection is critical, zone 220 extends around the outer edge of windshield 200 where windshield 200 is fixably coupled to the frame of fuselage 130, zone 250 is in the center of windshield 250 where less brittle protection is needed, and zones 230 and 240 are disposed between zones 220 and 250 and provide an appropriate level of protection against brittle failure in these regions.

Figure 2B:
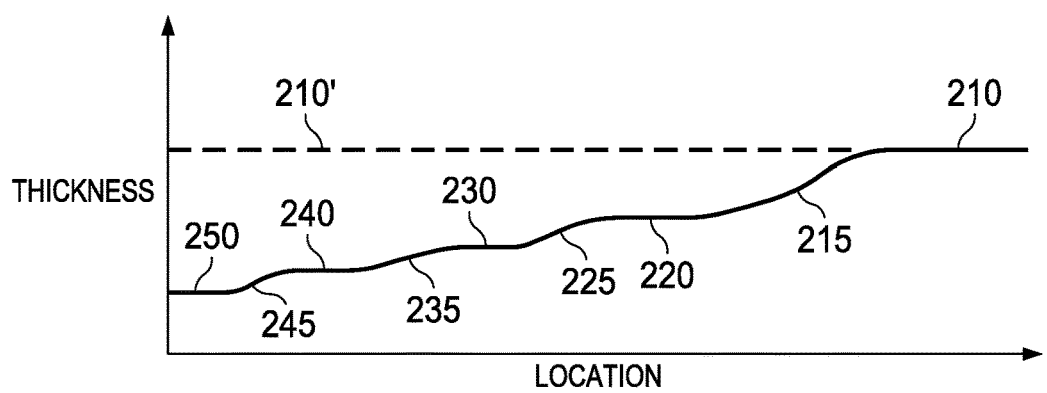
FIG. 2B shows a chart of the thickness of the front windshield of FIG. 1 across a line indicated in FIG. 2A.

FIG. 2B shows a chart of the thickness of windshield 200 across a line indicated in FIG. 2A. As can be seen in FIG. 2B, the thickness of windshield 200 decreases as one moves from zone 210 to zone 250. Transition zones 215-245 provide smooth transitions between zones 210-250. Teachings of certain embodiments recognize that providing transition zones may reduce step changes that could cause fracture modes and optical distortions. In the example of FIGS. 2A and 2B, the transition zones are graduate transition portions having a curved profile with no sharp angles.

Teachings of certain embodiments recognize that the variations in thickness of windshield 200 are purposeful and part of the design process. These variations may be distinguished from traditional thermoforming processes that may produce variations up to 10% among different locations that are random, not predictable, and are not related to performance benefits.

Zones such as zones 210-250 may have any thickness suitable for providing sufficient protection against brittle failure and/or other failure modes. In some embodiments, the thicknesses across the windshield may be determined using test data and/or finite element analysis. In an example variation of the windshield 200 of FIG. 2A, zone 210 may have a thickness of 0.2 inches, zone 220 may have a thickness of 0.1 inches, and zone 250 may have a thickness of 0.08 inches.

Teachings of certain embodiments recognize that windshield 200 may provide substantial weight savings over typical windshields. For example, as a reference, FIG. 2B shows a thickness 210'. This thickness 210' refers to what the thickness of windshield 200 would be if the entire windshield has a uniform thickness sufficient to protect against brittle failures across all points of the windshield. In this example, the largest portion of windshield 200 (zone 250) may be over 50% thinner and lighter than it would be if the thickness was equal to thickness 210'.

Although one might expect such changes in thickness across windshield 200 to result in optical distortions, teachings of certain embodiments recognize that windshield 200 may provide better optics due to the smaller thickness of zone 250. By reducing the thickness of windshield 200 in the largest portion of the windshield (and the portion used most by pilots), windshield 200 may offer better visibility than a windshield with thicker material in this region.

Variable-thickness windshields such as windshield 200 may be manufactured using a number of different techniques. In one example embodiment, a thermoforming process is used to form the windshield from flat sheet polymer by providing more clamping or anchored points at critical locations so the thinning down at those locations during thermoforming is reduced. Similarly, providing less or no anchored points at non-critical locations may allow the polymer to thin down more there. In another example embodiment, windshield 200 may be manufactured using an injection mold that has a contour that results in a variable-thickness windshield.

As described above, different windshields may have different thickness configurations depending on the particularities of the windshield's design and use. More details on an example scenario for determining thickness values and locations for a windshield according to one example embodiment is contained in U.S. Provisional Patent Application No. 62/131,011, which is incorporated by reference in its entirety.

In this example, analytical models were developed using the commercially available general-purpose nonlinear, transient dynamic explicit finite element (FE) code, LS-DYNA®. The analytical modeling effort focused on developing an accurate material model for the polycarbonate and an accurate modeling representation for the surrounding airframe structure. A combination of experimental testing and finite element modeling was used to characterize the transition from ductile failure to brittle fracture for the polycarbonate material. Factors such as loading rate and stress state that affect the failure mode and failure transition from ductile to brittle were studied to correlate the material model. The resulting analytical tool has demonstrated good correlation to tests, and has been integrated into design practices where there is a need to evaluate proposed structural modifications or variations to the windshield.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a hub;
   a rotor blade coupled to the hub; and
   a front windshield coupled to the body, the front windshield having a non-uniform thickness profile, wherein the front windshield comprises a plurality of thickness zones and a plurality of corners, and wherein:
      a first thickness zone having a first thickness comprises an upper outboard corner of the front windshield, wherein the upper outboard corner includes, at least in part, an edge of the front windshield;
      a second thickness zone having a second thickness comprises other corners of the front windshield, wherein the other corners include, at least in part, the edge of the front windshield, and the second thickness is smaller than the first thickness; and
      a third thickness zone having a third thickness comprises a center portion of the front windshield, and the third thickness is smaller than the second thickness.

2. The rotorcraft of claim 1, wherein the front windshield comprises a single, continuous, uninterrupted material for the plurality of thickness zones.

3. The rotorcraft of claim 1, wherein the non-uniform thickness profile comprises gradual transition portions between each of the plurality of thickness zones, the gradual transition portions providing transitions between the plurality of thickness zones.

4. The rotorcraft of claim 1, wherein the first thickness is at least twice as thick as the third thickness.

5. The rotorcraft of claim 1, wherein the front windshield is fixably coupled to the body.

6. The rotorcraft of claim 1, wherein the front windshield comprises an optically-transparent material.

7. The rotorcraft of claim 6, wherein the optically-transparent material is polycarbonate.

8. A windshield, comprising:
   an optically-transparent material having a non-uniform thickness profile and a plurality of thickness zones; and
   a plurality of corners, wherein:
      a first thickness zone having a first thickness comprises an upper outboard corner of the windshield, wherein the upper outboard corner includes, at least in part, an edge of the windshield;
      a second thickness zone having a second thickness comprises other corners of the windshield, wherein the other corners include, at least in part, the edge of the windshield, and the second thickness is smaller than the first thickness; and
      a third thickness zone having a third thickness comprises a center portion of the windshield, and the third thickness is smaller than the second thickness.

9. The windshield of claim 8, wherein the optically-transparent material is a single, continuous, uninterrupted material for the plurality of thickness zones.

10. The windshield of claim 8, wherein the non-uniform thickness profile comprises gradual transition portions between each of the plurality of thickness zones, the gradual transition portions providing transitions between the plurality of thickness zones.

11. The windshield of claim 8, wherein the first thickness is at least twice as thick as the third thickness.

12. The windshield of claim 8, wherein the optically-transparent material is polycarbonate.

13. The rotorcraft of claim 1, wherein the plurality of thickness zones includes a fourth thickness zone having a fourth thickness that is less than each of the first thickness and the second thickness and is greater than the third thickness.

14. The rotorcraft of claim 13, wherein the plurality of thickness zones includes a fifth thickness zone having a fifth thickness that is less than each of the first thickness, the second thickness, and the fourth thickness and is greater than the third thickness.

15. The rotorcraft of claim 14, wherein the fourth thickness zone is, at least in part, between the second thickness zone and the fifth thickness zone.

16. The rotorcraft of claim 15, wherein the fifth thickness zone is, at least in part, between the fourth thickness zone and the third thickness zone.

17. The windshield of claim 8, wherein the plurality of thickness zones includes a fourth thickness zone having a fourth thickness that is less than each of the first thickness and the second thickness and is greater than the third thickness.

18. The windshield of claim 17, wherein the plurality of thickness zones includes a fifth thickness zone having a fifth thickness that is less than each of the first thickness, the second thickness, and the fourth thickness and is greater than the third thickness.

19. The windshield of claim 18, wherein the fourth thickness zone is, at least in part, between the second thickness zone and the fifth thickness zone.

20. The windshield of claim 19, wherein the fifth thickness zone is, at least in part, between the fourth thickness zone and the third thickness zone.

* * * * *